United States Patent [19]

Larkin et al.

[11] Patent Number: 4,827,039

[45] Date of Patent: May 2, 1989

[54] NITRILO(TRIS)POLYOXYALKYLENEAMINES IN A REACTION INJECTION MOLDING PROCESS

[75] Inventors: John M. Larkin; Michael Cuscurida, both of Austin, Tex.

[73] Assignee: Texaco Inc., White Plains, N.Y.

[21] Appl. No.: 80,930

[22] Filed: Aug. 3, 1987

[51] Int. Cl.$^4$ .............................................. C07C 73/94
[52] U.S. Cl. .................................... 564/505; 564/475
[58] Field of Search ................................ 564/505, 475

[56] References Cited

U.S. PATENT DOCUMENTS

| | | | |
|---|---|---|---|
| 3,331,791 | 7/1967 | Cuscurida | 564/505 |
| 3,832,402 | 8/1974 | Yeakey | 564/505 |
| 4,362,856 | 12/1982 | Kluger | 564/505 |

Primary Examiner—Amelia Burgess Yarbrough
Assistant Examiner—Christine A. Skane
Attorney, Agent, or Firm—Jack H. Park; Kenneth R. Priem; Richard A. Morgan

[57] ABSTRACT

The invention is an amine terminated polyether of the formula:

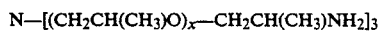

$$N-[(CH_2CH(CH_3)O)_x-CH_2CH(CH_3)NH_2]_3$$

of 3000 to 7000 molecular weight.

The polyamines are particularly suited for reaction with isocyanates to manufacture articles such as automobile body panels by reaction injection molding (RIM).

4 Claims, No Drawings

NITRILO(TRIS)POLYOXYALKYLENEAMINES IN A REACTION INJECTION MOLDING PROCESS

CROSS REFERENCE TO RELATED APPLICATION

The invention is related to U.S. patent application titled Bis(Diaminopolyalkoxy)-N-Alkylamines by Amination of Hydroxyl-Containing Tertiary Amines by John M. Larkin and George P. Speranza, Ser. No. 07/080,929 filed on even date.

1. FIELD OF THE INVENTION

The invention is a composition of matter of the formula:

wherein: $R_1$ is a methyl or ethyl radical, $R_2$ is hydrogen or $R_1$, AO is an alkylene oxide, x is 1 or greater, and x+y ranges from 2 to 40.

These polyamines are paricularly suited for reaction with isocyanates to manufacture articles by a Reaction Injection Molding (RIM) process.

2. DESCRIPTION OF RELEVANT METHODS IN THE FIELD

Reaction Injection Molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen-containing materials with polyisocyanate and placing the mixture into a mold where reaction proceeds. After reaction and demolding, the parts may be subjected to an additional curing step which comprises placing the parts in an oven, held at 250° F. or higher.

The amination of long alkoxylated alkyl chains terminated by hydroxyl groups is well known in the art.

U.S. Pat. No. 3,654,370 to E. L. Yeakey teaches the amination of polyoxyalkylene polyols to form the corresponding amines by means of ammonia and hydrogen over a catalyst-prepared by the reduction of a mixture of the oxides of nickel, copper and chromium. The amination is carried out at a temperature of 150° to 275° C. and 500 to 5000 psig.

U.S. Pat. No. 4,409,399 to H. E. Swift et al. teaches a catalyst for aminating aliphatic alcohols and aldehydes. The unsupported catalyst comprises (1) copper oxide or copper hydroxide and (2) nickel oxide or nickel hydroxide, and optionally (3) an oxide or hydroxide of a Group IIA, e.g. magnesium, barium. The reaction is carried out at a temperature of 150° to 250° C. and 1 to 100 atm with continuous water removal.

U.S. Pat. No. 3,390,184 to P. H. Moss et al. teaches a process for converting a secondary alcohol to a high molecular weight primary amine by means of a hydrogenation-dehydrogenation catalyst comprising at least one member selected from the group consisting of the metals and oxides of nickel and cobalt, together with copper and a metal oxide selected from the group consisting of chromium oxide, molybdenum oxide, manganese oxide and thorium oxide. The reaction is carried out at a temperature of 225° to 260° C. and pressure of 2000 to 4000 psig, with ammonia as the aminating agent.

U.S. Pat. No. 3,373,204 to R. A. Hales et al. teaches a catalytic process for producing secondary amines from derivatives of phenols, alcohols and amines containing 5 to 40 moles of ethylene oxide and propylene oxide. The catalyst is Raney nickel and ammonia or primary alkylamines as the aminating agent. The reaction is carried out at 200° to 275° C. with the evolution of water. Amines include lauryl amine, hexadecyl amine, octadecyl amine, rosin amine and fatty acid amines.

U.S. Pat. No. 3,347,926 to J. D. Zech teaches a catalytic process for aminating primary and secondary aliphatic alcohols. The catalyst comprises a chromium promoted Raney nickel. The reaction is carried out at 150° C. to 275° C. with ammonia, primary amines or secondary amines of 1 to 6 carbon atoms.

U.S. Pat. No. 2,923,696 to K. E. Harwell et al. teaches resinous compositions formed by the reaction of an epoxy resin with a high boiling amine product. The patent further teaches hydrogenation catalysts employing copper, nickel, cobalt and oxides thereof.

U.S. Pat. No. 4,130,590 to Hobbs et al. teaches the production of long chain unsaturated amines such as N-(alkadienyl)amines and saturated or hydrated derivatives thereof.

SUMMARY OF THE INVENTION

The invention is a composition of matter of the formula:

wherein: $R_1$ is a methyl or ethyl radical, $R_2$ is a hydrogen, methyl or ethyl radical, AO is an alkylene oxide selected from the group consisting of ethylene oxide, propylene oxide and mixtures thereof, x is 1 or greater and x+y ranges from 2 to 40.

These amine terminated polyethers are particularly useful when reacted with a polyisocyanate in a reaction injection molding (RIM) process. In the RIM process, ingredients comprising an amine terminated polyether, a diamine chain extender and a polyisocyanate are reacted in a closed mold to produce articles such as automobile body panels.

DESCRIPTION OF THE PREFERRED EMBODIMENTS

An object of this invention is to produce RIM polyurethane parts with superior properties. It was surprisingly discovered that the instant hydroxyl terminated polyether initiators yielded higher conversion of hydroxyl to amino groups than the glycerine initiated analog.

RIM elastomers are typically made by reacting an amine, a chain extender and a polyisocyanate together in a mold. Optional additives include catalysts, filler materials, mold release agents and the like.

In this case, the amine component of the RIM elastomer is the nitrilo(tris) polyoxyalkyleneamines of this invention. The amine terminated polyethers useful in a RIM process have a molecular weight of at least 500, and preferably at least 3000. Those polyether amines based on the instant nitrilo(tris) polyoxyalkyleneamine of about 3000 to 7000 molecular weight are especially preferred. The polyethers may be prepared from ethylene oxide, propylene oxide, butylene oxide or mixtures of propylene oxide, butylene oxide and/or ethylene oxide.

The polyethers are aminated as described in U.S. Pat. No. 3,654,370 to E. L. Yeakey which describes the amination of polyoxyalkylene polyols to form the corresponding amines. The amination is catalyzed by a catalyst prepared from a mixture of the oxides of nickel, copper and chromium in the presence of ammonia and hydrogen at 150° to 275° C. and 500 to 5000 psig. It has been discovered that polyether polyols can be reductively aminated provided the amine is sterically hindered. Hinderance of the tertiary amine stabilizes the molecule, preventing cleavage of the hindered tertiary amine by the metallic catalyst. In the instant invention, the tertiary amine is hindered by surrounding it with sterically bulky alkyl groups attached to alkylene oxide molecules. If the tertiary amine were not hindered, the polyether chains are cleaved at the nitrogen atom, yielding a variety of decompositon products rather than the triamine.

The chain-extenders useful in the process of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. These chain-extenders produce a polymer having a high glass transition temperature and/or high melting points when reacted with a suitable diisocyanate. It has been discovered that the polyurethane polymers of this invention which have a high glass transition temperature and a high melting point also show the improved properties in the process of this invention. Other chain-extenders including cyclic diols such as 1,4-cyclohexane diol and ring containing diols such as bis-hydroxyethylhydroquinone, amide or ester containing diols or amino alcohols, aromatic diamines and aliphatic amines are also suitable as chain-extenders in the practice of this invention.

The polyisocyanate used to react with the nitrilo(tris) polyoxyalkylene amine initiators may be aromatic or aliphatic polyisocyanate.

Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These isocyanate compounds are produced by the phosgenation of corresponding methylene bridged polyphenyl polyamines, which are conventionally produced by the reaction of formaldehyde and primary aromatic amines, such as aniline in the presence of hydrochloric acid and/or other acidic catalysts. Known processes for preparing polyamines and corresponding methylene-bridged polyphenyl polyisocyanates therefrom are described in U.S. Pat. Nos. 2,683,730; 2,950,263; 3,012,008; 3,344,162 and 3,362,979.

Usually methylene-bridged polyphenyl polyisocyanate mixtures contain about 20 to about 100 wt % methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 wt % methylene diphenyldiisocyanate isomers, of which 20 to about 95 wt % thereof is the 4,4'-isomer with the remainder being polymethylene polyphenyl polyisocyanates of higher molecular weight and functionality that have an average functionality of from about 2.1 to about 3.5. These isocyanate mixtures are commercially available and can be prepared by the process described in U.S. Pat. No. 3,362,979 to Floyd E. Bentley.

The most preferred aromatic polyisocyanate is methylene bis(4-phenylisocyanate) or MDI. Pure MDI, quasi-prepolymers of MDI, modified pure MDI, are all useful in the preparation of RIM elastomers. Since pure MDI is a solid and thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst to give a mixture of pure MDI and modified MDI. Preferably, the amount of isocyanates used is the stoichiometric amount based on all the ingredients in the formulation or greater than the stoichiometric amount. Examples of commercial materials of this type are Upjohn's Isonate® 125M (pure MDI) and Isonate® 143L (liquid MDI).

Although not essential for the practice of this invention, additives which enhance the color or properties of the polyurethane elastomer may be used. For example, chopped or milled glass fibers, chopped or milled carbon fibers and/or other mineral fibers are useful.

The RIM polyurethane elastomers of this invention are made in the conventional manner in a mold and are then post cured at temperatures of about 250° F. to 425° F. and preferably about 310° F. to 350° F.

Another type of additive which may be required as post curing temperatures approach 400° F. or more is an antioxidant. The materials which are well known to those skilled in the art include hindered phenols.

The following examples demonstrate our invention. They are not to be construed as limiting our invention in any way but merely to be exemplary of the improvement and manner in which our invention may be practiced.

EXAMPLE 1

Preparation of the 5100 Molecular Weight Propylene Oxide Adduct of Triisopropanolamine (TIPA)

To a ten-gallon kettle were charged 5 lb. of a 657 molecular weight propylene oxide adduct of TIPA and 151.2 g of 45% aqueous potassium hydroxide. The reactor was then purged with nitrogen and heated to 100° C. The initiator was then dried, with vacuum and nitrogen to a water content of less than 0.1%. Propylene oxide (44.3 lb) was then reacted at 105°–110° C. at 50 psig. Approximately 8.4 hours was required for addition of the propylene oxide. The reaction mixture was then digested two hours to equilibrium pressure. The alkaline product was neutralized by stirring two hours with 408 g magnesium silicate added as an aqueous slurry. Di-t-butyl p-cresol (22.4 g) was then added to stabilize the polyol. The neutralized polyol was vacuum stripped to a minimum pressure, nitrogen stripped, and filtered. The finished product had the following properties.

| Hydroxyl no., mg KOH/g | 32.5 |
| --- | --- |
| Water, wt % | 0.02 |
| Unsaturation, meq/g | 0.055 |
| pH in 10:6 isopropanol/water | 9.3 |
| Viscosity, cs | |
| 77° F. | 1051 |
| 100° F. | 621 |
| Total amine, meq/g | 0.16 |
| Tertiary amine, meq/g | 0.16 |

EXAMPLE 2

Reductive Amination of ~5000 Molecular Weight Polyol Using A Nickel Catalyst

A 1-liter stirred autoclave was charged with 605 g of a 5100 mol wt. propylene oxide adduct of triisopropanolamine of Example 1, with 65.001 g of a powdered, supported 47 wt % nickel catalyst, and with 74.7 g of NH$_3$ in a hydrogen atmosphere. The pressure in the autoclave was increased to 350 psig with hydrogen (at 28° C.). The temperature was raised to 243.1° C. (1965 psig) during a 60-minute period. It was maintained at 241.5° to 247.3° C. (average ~245° C.) for 30 minutes. It was then cooled rapidly to room temperature (155 psig at 26° C). The contents of the autoclave were filtered, and the filtrate was stripped on a rotary evaporator at 99° C./5 mm Hg. Analyses indicated:

| Measured | Theoretical |
| --- | --- |
| 0.583 meq/g total acetylatables | 0.58 |
| 0.54 meq/g total amines | 0.74 |
| 0.47 meq/g primary amines | 0.58 |
| 0.16 meq/g tertiary amines | 0.16 |

The high degree of conversion with complete retention of tertiary amine functionality was noteworthy.

EXAMPLE 3

Preparation of a 5000 Molecular Weight Product Using Mo-Promoted Raney Ni Catalyst The procedure of Example 2 was repeated, except the catalyst was 60.02 g of anhydrous Raney 3100 (from W. R. Grace & Co.). The quantities of polyol and NH$_3$ were 695.6 and 52.95 g, respectively, initial pressure was 555 psig at 32.0° C., heat up time was 45 minutes, and average temperature was 246° C. for 13 minutes. Analyses of the stripped and filtered product was as follows:

Total acetylatables=0.595 meq/g
Total amines=0.62 meq/g
Primary amines=0.45 meq/g
Tertiary amines=0.15 meq/g Again, the nearly complete retention of tertiary amine functionality was noteworthy.

EXAMPLE 4

Preparation of Product Using Ni/Cu/Cr Catalyst

Example 2 was repeated, except that the catalyst was 75.01 g of the powdered Ni/Cu/Cr catalyst of U.S. Pat. No. 3,654,370 to Yeakey. Initial pressure was 473 psig, and average reaction temperature was 248° C. It yielded product with the following analyses:

| Total acetylatables | 0.574 meq/g |
| --- | --- |
| Total amines | 0.41 meq/g |
| Primary amines | 0.25 meq/g |
| Tertiary amines | 0.16 meq/g |

EXAMPLE 5 (Comparative)

Amination of Polypropoxylated Triethanolamine

The procedure of Example 3 was repeated except the polyol was a polypropoxylated triethanolamine with the following analyses:

| Total acetylatables | 0.549 meq/g |
| --- | --- |
| Total amines | 0.16 meq/g |
| Tertiary amines | 0.15 meq/g |

After conducting the reaction as in Example 3 (at 245° C. avg. operating temperature and 497 psig initial pressure), the filtered and stripped product had the following analyses:

| Total acetylatables | 0.797 meq/g |
| --- | --- |
| Total amines | 0.75 meq/g |
| Primary amines | 0.66 meq/g |
| Tertiary amines | 0.04 meq/g |

The essentially complete destruction of the tertiary amine functionality with concomitant increase in total acetylatable and secondary amine (calculated by difference to be 0.05 meq/g) was noteworthy.

EXAMPLE 6

Continuous Preparation of Product Using Cr-promoted Raney Ni Catalyst

A 100 cc tubular reactor was charged with 6×8 mesh chromium-promoted Raney nickel. It was maintained at 2000 psig while NH$_3$, H$_2$, and the polyol of Example 1 were simultaneously introduced at four sets of operating conditions. The hydrogen rate was 5 l/hr. and the NH$_3$ concentration (as percent of total liquid weight) was 48-53% in each case. The conditions and results were the following:

| | | | Meq/g | | | |
| --- | --- | --- | --- | --- | --- | --- |
| Run No. | °C. | g/cc/hr Polyol Space Vel. | Total Acetyl- atables | Total Amine | Primary Amine | Tertiary Amine |
| 1 | 205 | 0.60 | 0.572 | 0.60 | 0.44 | 0.15 |
| 2 | 215 | 0.61 | 0.582 | 0.66 | 0.50 | 0.15 |
| 3 | 225 | 0.63 | 0.598 | 0.69 | 0.53 | 0.14 |
| 4 | 215 | 0.58 | 0.584 | 0.66 | 0.50 | 0.15 |

EXAMPLE 7

Continuous Preparation of Product Using Ni/Cu/Cr

The procedure of Example 6 was repeated except tableted Ni/Cu/Cr catalyst of Example 4 was used. Conditions and results are shown in Table 1.

TABLE 1

| | | | Continuous Preparation of Product Using Harshaw Ni-2715 Catalyst | | | | | | |
|---|---|---|---|---|---|---|---|---|---|
| Stripped Material Ref. No. | Hot Spot Temp. °C. | Reactor Pressure Psig | Polyol Wt SV g/cc/Hr | Weight % Ammonia | Hydrogen Flowrate 1/Hr. | Total Acetyl Meq/g | Total Amines Meq/g | Primary Amines Meq/g | Tertiary Amines Meq/g | % Conv. |
| 6222-26-1 | 210 | 2050 | .53 | 50.75 | 5.00 | .66 | .50 | .34 | .16 | 51.67 |
| 6222-26-2 | 215 | 1950 | .61 | 49.25 | 5.00 | .59 | .50 | .34 | .15 | 59.42 |
| 6222-26-3 | 220 | 2050 | .52 | 50.41 | 5.00 | .63 | .54 | .38 | .15 | 85.44 |
| 6222-26-4 | 225 | 2000 | .61 | 47.78 | 5.00 | .59 | .56 | .40 | .15 | 94.76 |
| 6222-29-1 | 215 | 2000 | .46 | 54.99 | 5.00 | .59 | .53 | .37 | .15 | 64.41 |
| 6222-29-2 | 215 | 2000 | .48 | 57.55 | 5.00 | .58 | .52 | .36 | .15 | 63.79 |
| 6222-38-1 | 220 | 2000 | .38 | 61.41 | 4.50 | .61 | .59 | .43 | .14 | 73.77 |
| 6222-30-2 | 225 | 1950 | .39 | 58.33 | 4.50 | .64 | .64 | .48 | .14 | 78.12 |

EXAMPLE 8

Use of Product in Polyurea RIM

The product made in Example 7 (Product 6222-29-1) was used to produce polyurea RIM. The characteristics of the plastic elastomer made using this product are comparable or superior to those of the standard elastomers made from JEFFAMINE ® T-5000, a polypropylene oxide triamine of about 5000 molecular weight. This product yields an elastomer which is characterized by a longer gel time and a higher green strength than the comparative product.

Quasi-prepolymer A was prepared by reacting THANOL ® SF-5505 a 5000 molecular weight, high reactivity triol (40 wt %) with ISONATE ® 143L (60 wt %)

EXAMPLE 8A

Polyamine 6277-6a (66.0 pbw), diethyltoluene diamine (DETDA) (34.0 pbw), and zinc stearate (1.58 pbw) were charged into the B-component working tank of an Accuratio VR-100 two-component RIM machine and heated to 200° F. for 30 minutes to dissolve the zinc stearate. The B-component tank was then cooled to 132° F. Quasi-prepolymer A (109.3 pbw) was charged into the A-component tank and the temperature of this component was adjusted to 127° F. The components were injected into the flat plaque mold measuring 18-in.×18-in.×0.125-in. which had been preheated to 160° F. The part was removed from the mold in 30 seconds. The resulting elastomer was post cured at 311° F. for 60 minutes. Physical properties of the elastomer are shown in Table 2. The gel time of this material was determined to be 1.7 seconds. Processing of this formulation was very good.

EXAMPLE 8B (Comparative)

JEFFAMINE ® T-5000 (66.0 pbw), DETDA (34.0 pbw) and zinc stearate (1.58 pbw) were charged into the B-component working tank of an Accuratio VR-100 two-component RIM machine and heated to 200° F. for 30 minutes to dissolve the zinc stearate. The B-component tank was then cooled to 135° F. Quasi-prepolymer A (108.0 pbw) was charged into the A-component tank and the temperature of this component was adjusted to 131° F. The components were injected into the flat plaque mold measuring 18-in.×18-in.×0.125-in. which had been preheated to 160° F. The part was removed from the mold in 30 seconds. The resulting elastomer was post cured at 311° F. for 60 minutes. Physical properties of the elastomer are shown in Table 2. The gel time of this material was 1.6 seconds.

TABLE 2

| Example | 8A | 8B |
|---|---|---|
| Tensile, psi | 4280 | 4190 |
| Tear, pli | 525 | 500 |
| Ultimate elongation, % | 230 | 230 |
| Flexural modulus, psi | | |
| −20° F. | 113,500 | 109,500 |
| 77° F. | 56,600 | 54,300 |
| 158° F. | 44,000 | 40,900 |
| 311° F. | 36,000 | 32,300 |
| Heat sag, mm | | |
| 250° F., 150 mm overhang | 5.1 | 6.6 |
| 311° F., 150 mm overhang | 12.8 | 15.2 |
| Izod impact, ft-lb/in. notch | 6.8 | 7.8 |
| Green strength, lbs | 9.5 | 9.2 |

TABLE OF TEST METHODS

| | |
|---|---|
| Tensile, psi | ASTM D-638 |
| Tear, pli | ASTM D-624 |
| Ultimate elongation, % | ASTM D-638 |
| Flexural modulus, psi | ASTM D-790 |
| Izod impact, ft-lb/in. notch | ASTM D-256 |
| Heat sag, mm | Heat sag is determined in accordance with Test CTZZZ0066AA of the Chevrolet Division of General Motors Corporation, Flint, Michigan, and is the sample sag in millimeters when exposed to the specified temperature for 60 minutes. |
| Green Strength, lb. | lb. force to tear a ⅛ inch plaque after demolded 20 sec., by Chatillion guage, manual model LIC compression tester manufactured by John Chatillion and Sons., Inc. |

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. A composition of matter of the formula:

wherein: $R_1$ is a methyl or ethyl radical, $R_2$ is a hydrogen, methyl or ethyl radical, AO is an alkylene oxide selected from the group consisting of ethylene oxide, propylene oxide, butylene oxide and mixtures thereof, x 1 or greater and x+y ranges from 2 to 40.
2. The composition of matter of claim 1 wherein x+y ranges from 20 to 30.
3. A composition of matter of the formula:
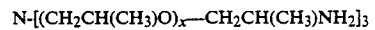
wherein: x ranges from 2 to 40.
4. The composition of matter of claim 3 wherein x ranges from 20 to 30.
* * * * *